(12) United States Patent
Annamalai et al.

(10) Patent No.: US 12,694,058 B2
(45) Date of Patent: Jul. 28, 2026

(54) INTERACTIVE REAL-TIME VIDEO SEARCH BASED ON KNOWLEDGE GRAPH

(71) Applicant: Cisco Technology, Inc., San Jose, CA (US)

(72) Inventors: Kanishka Priyadharshini Annamalai, Theni (Dts) TamilNad (IN); Manjula Shivanna, Cupertino, CA (US); Shivam Bajpai, Amruthahalli (IN); Gurvinder Singh, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 12 days.

(21) Appl. No.: 18/514,739

(22) Filed: Nov. 20, 2023

(65) Prior Publication Data

US 2025/0165529 A1     May 22, 2025

(51) Int. Cl.
G06F 16/78         (2019.01)
G06N 5/02         (2023.01)
G06N 20/00        (2019.01)

(52) U.S. Cl.
CPC ............... G06F 16/78 (2019.01); G06N 5/02 (2013.01); G06N 20/00 (2019.01)

(58) Field of Classification Search
CPC ........... G06F 16/78; G06N 20/00; G06N 5/02
See application file for complete search history.

(56) References Cited

U.S. PATENT DOCUMENTS 10,459,975 B1 * 10/2019 Malpani ................. G06F 16/735
11,182,748 B1 * 11/2021 Neckermann .......... G06N 5/022

11,558,440 B1 * 1/2023 Tadesse ................. G11B 27/28
11,809,480 B1 * 11/2023 Cheng ................... G06F 16/434
(Continued)

FOREIGN PATENT DOCUMENTS

CN             116662500 A       8/2023

OTHER PUBLICATIONS

C. He, J. Zhang, J. Yao, L. Zhuo and Q. Tian, "Meta-Learning Paradigm and CosAttn for Streamer Action Recognition in Live Video, " in IEEE Signal Processing Letters, vol. 29, pp. 1097-1101, 2022, doi: 10.1109/LSP.2022.3168195. (Year: 2022).*
(Continued)

*Primary Examiner* — Matthew J Ellis
(74) *Attorney, Agent, or Firm* — Edell, Shapiro & Finnan, LLC

(57)                 ABSTRACT

A method, computer system, and computer program product are provided for real-time video searching based on augmented knowledge graphs that are generated using machine learning models. Multimedia data is obtained comprising an image portion and an audio portion, and a user query with respect to the multimedia data is obtained. A knowledge graph of the multimedia data is generated using one or more machine learning models based on the image portion and the audio portion, wherein the knowledge graph includes a plurality of entities and relationships between entities. An augmented knowledge graph is generated, wherein the augmented knowledge graph augments the knowledge graph with additional entities and additional relationships between the additional entities using additional data that is obtained from a source external to the multimedia data. A response to the user query is provided based on the augmented knowledge edge graph.

20 Claims, 10 Drawing Sheets

(56) References Cited

U.S. PATENT DOCUMENTS

| | | | |
|---|---|---|---|
| 2017/0092273 | A1 | 3/2017 | Roberts |
| 2017/0228239 | A1* | 8/2017 | Elassaad ............... G06F 16/904 |
| 2021/0073654 | A1* | 3/2021 | Ameri ................. G06F 16/9536 |
| 2021/0089860 | A1* | 3/2021 | Heere .................... G06N 20/00 |
| 2022/0075948 | A1 | 3/2022 | Yuan et al. |
| 2022/0230625 | A1* | 7/2022 | Zhu ....................... G10L 15/063 |
| 2022/0414348 | A1 | 12/2022 | Muralitharan et al. |
| 2024/0020463 | A1 | 1/2024 | Martinsen et al. |
| 2024/0121125 | A1* | 4/2024 | Blair .................... G06F 40/263 |

OTHER PUBLICATIONS

Dissanayake, C., et al., "Automatic Question Extractor and Answer Detector in a Recorded Webinar", 2022 International Symposium on Electrical, Electronics and Information Engineering (ISEEIE), Feb. 25-27, 2022, pp. 139-144.

Dol, M., et al., "Knowledge Retrieval using Question Answering Approach on Epidemiology data", 2022 Second International Conference on Computer Science, Engineering and Applications (ICCSEA), Sep. 8-8, 2022, 6 Pages.

He, C., et al., "Meta-Learning Paradigm and CosAttn for Streamer Action Recognition in Live Video", IEEE Signal Processing Letters, vol. 29, Apr. 19, 2022, pp. 1097-1101.

Niranjan, P.Y., et al., "Proposed Model for Document/Answer Extraction using Machine Learning Techniques", 2022 International Conference on Machine Learning, Big Data, Cloud and Parallel Computing (COM-IT-CON), May 26-27, 2022, pp. 103-107.

Thiruvanantharajah, M., et al., "Automated Question and Answer Generating System for Educational Platforms", 2021 6th International Conference on Information Technology Research (ICITR), Dec. 1-3, 2021, 6 Pages.

Kirdemir B., et al., "Assessing Bias in YouTube's Video Recommendation Algorithm in a Cross-lingual and Cross-topical Context", Social, Cultural, and Behavioral Modeling, Jul. 4, 2021, 10 pages, https://link.springer.com/chapter/10.1007/978-3-030-80387-2_7.

Liu Y., et al., "MMKG: Multi-Modal Knowledge Graphs", arXiv:1903.05485v1 [cs.AI], Mar. 13, 2019, 15 pages.

McGarry K., "Analyzing Social Media Data Using Sentiment Mining and Bigram Analysis for the Recommendation of YouTube Videos", Information, vol. 14, No. 7, Published on Jul. 16, 2023, 20 pages.

Pan S., et al., "Unifying Large Language Models and Knowledge Graphs: A Roadmap", arXiv:2306.08302v3 [cs.CL], Jan. 25, 2024, 28 pages.

* cited by examiner

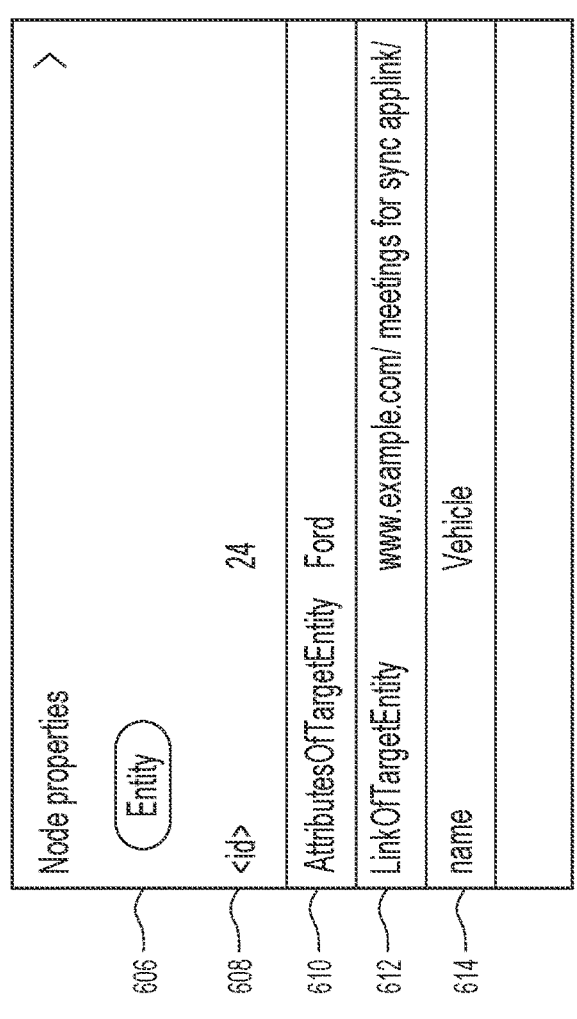
| Node properties | |
|---|---|
| Entity | |
| <id> | 24 |
| AttributesOfTargetEntity | Ford |
| LinkOfTargetEntity | www.example.com/ meetings for sync applink/ |
| name | Vehicle |
606
608
610
612
614
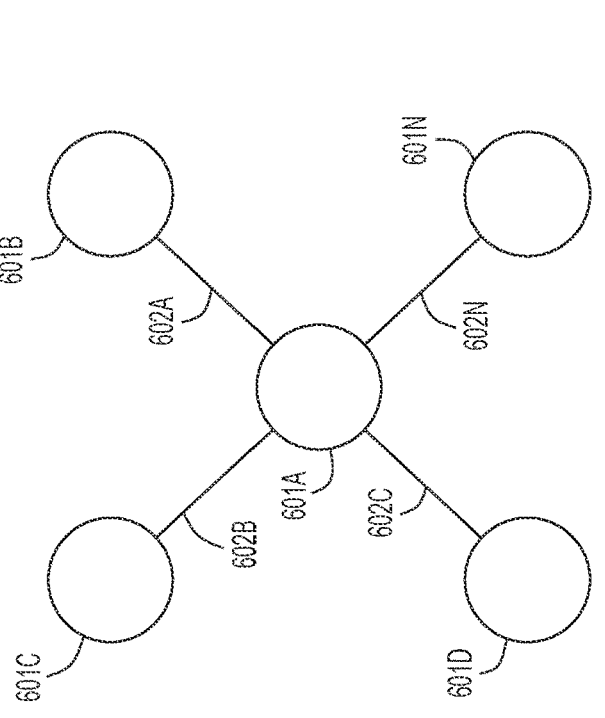
601B
602A
601N
602N
601A
602B
602C
601C
601D
FIG.6

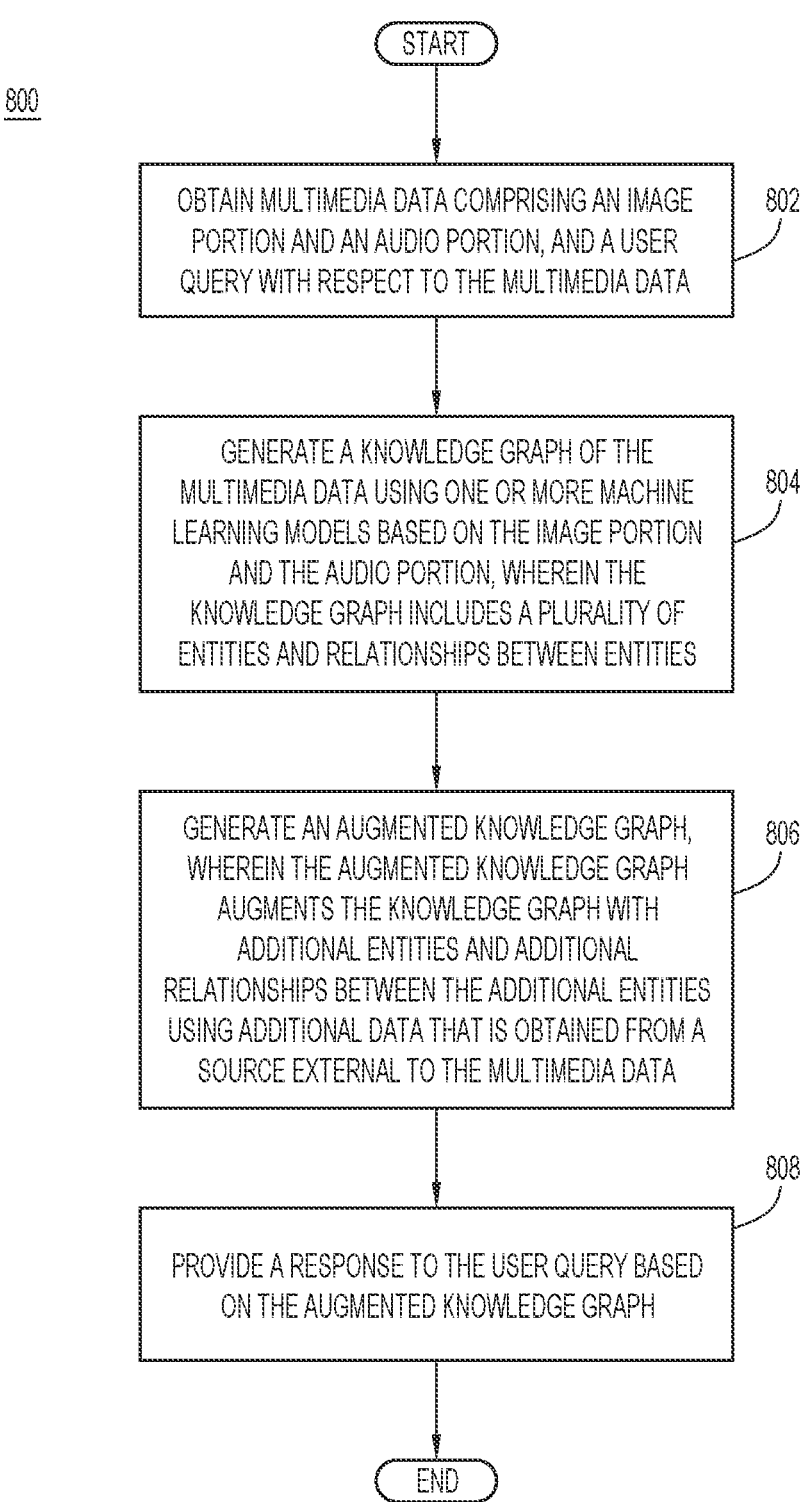

800

START

OBTAIN MULTIMEDIA DATA COMPRISING AN IMAGE
PORTION AND AN AUDIO PORTION, AND A USER
QUERY WITH RESPECT TO THE MULTIMEDIA DATA          802

GENERATE A KNOWLEDGE GRAPH OF THE
MULTIMEDIA DATA USING ONE OR MORE MACHINE
LEARNING MODELS BASED ON THE IMAGE PORTION        804
AND THE AUDIO PORTION, WHEREIN THE
KNOWLEDGE GRAPH INCLUDES A PLURALITY OF
ENTITIES AND RELATIONSHIPS BETWEEN ENTITIES

GENERATE AN AUGMENTED KNOWLEDGE GRAPH,           806
WHEREIN THE AUGMENTED KNOWLEDGE GRAPH
AUGMENTS THE KNOWLEDGE GRAPH WITH
ADDITIONAL ENTITIES AND ADDITIONAL
RELATIONSHIPS BETWEEN THE ADDITIONAL ENTITIES
USING ADDITIONAL DATA THAT IS OBTAINED FROM A
SOURCE EXTERNAL TO THE MULTIMEDIA DATA

808
PROVIDE A RESPONSE TO THE USER QUERY BASED
ON THE AUGMENTED KNOWLEDGE GRAPH

END

FIG.8

INTERACTIVE REAL-TIME VIDEO SEARCH BASED ON KNOWLEDGE GRAPH

TECHNICAL FIELD

The present disclosure relates generally to machine learning and multimedia processing.

BACKGROUND

Organizations often produce rich video content in the form of both live and pre-recorded videos. Video presentations have become an increasingly popular way to deliver educational content, to present products, and to provide customer support. In contrast to the delivery of information in the form of text, however, video content is as not easily searchable in order to obtain specific information.

BRIEF DESCRIPTION OF THE DRAWINGS

FIG. 6 is a block diagram depicting a knowledge graph user interface, according to an example embodiment.

FIG. 8 is a flowchart depicting a method of processing queries relating to multimedia content using knowledge graphs, according to an example embodiment.

DETAILED DESCRIPTION

Overview

Figure 1:
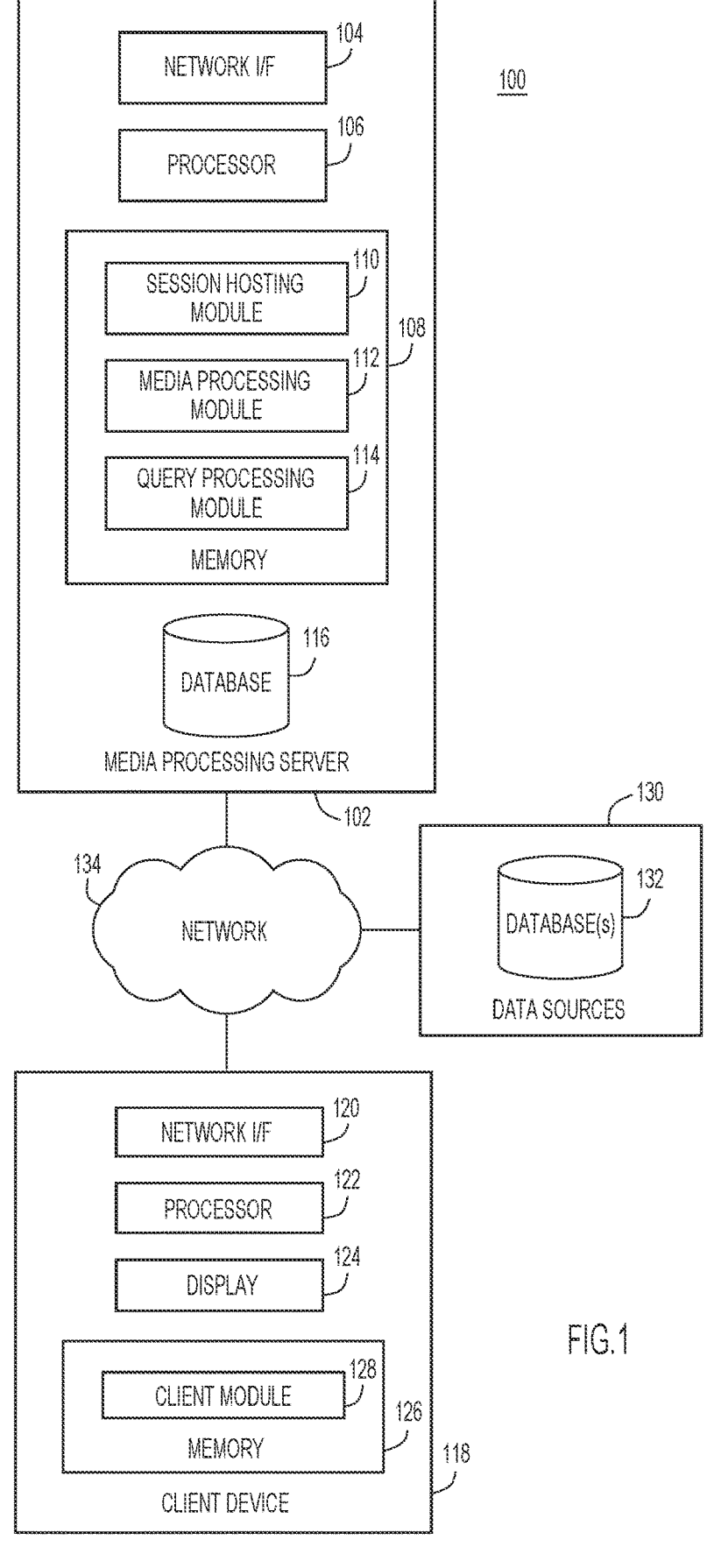
FIG. 1 is a block diagram depicting a network environment for processing queries relating to multimedia content using knowledge graphs, according to an example embodiment.

According to one embodiment, techniques are provided for real-time video searching based on augmented knowledge graphs that are generated using machine learning models. Multimedia data is obtained comprising an image portion and an audio portion, and a user query with respect to the multimedia data is obtained. A knowledge graph of the multimedia data is generated using one or more machine learning models based on the image portion and the audio portion, wherein the knowledge graph includes a plurality of entities and relationships between entities. An augmented knowledge graph is generated. The augmented knowledge graph expands the knowledge graph with additional entities and additional relationships between the additional entities using additional data that is obtained from a source external to the multimedia data. A response to the user query is provided based on the augmented knowledge graph.

Example Embodiments

Present example embodiments relate to machine learning and multimedia processing, and more specifically, to inter-active real-time video searching based on knowledge graphs that are generated using machine learning models. As a user watches a video, the user may have questions regarding content that is in the video or is otherwise related to the video. Addressing a question according to conventional techniques can be a time-consuming and disruptive process, as a user may have to manually seek content in a video, interrupt a presenter to ask a question, or use an Internet search engine to find the answers that they seek.

To address at least some of these problems, example embodiments utilize machine learning techniques to analyze videos, including live videos as they are streamed, to identify content and the contexts of content in the videos so that user queries can be answered in a fully automated manner. In the context of a real-time or pre-recorded video, a user query is obtained e.g., via voice or text, and an answer or a response to the user's query is generated based on a knowledge graph that includes content related to the video and optionally, similar videos, in a learning platform.

Moreover, in one or more example embodiments, video content may be analyzed to identify and extract key moments or segments from a video, such as exciting action sequences, important plot points, portions of video that relate to a particular topic, and the like. The process of generating highlights may include various techniques such as object detection, speech recognition, sentiment analysis, and/or image processing, which aid a machine learning model to identify relevant moments in the video. Overall, the ability to automatically generate highlights enhances the viewing experience by providing a convenient way to quickly identify the most interesting and impactful parts of a video.

The techniques presented herein can include various models, such as a text-based model that performs embedding extraction, an image-based model that performs embedding extraction, and a named entity recognizer to identify entities (e.g., objects, people, places, concepts, etc.) in a video. The text-based model can extract the context, semantic meanings, entities, and relationships between entities from transcript text data obtained from a video. Embeddings can be obtained, and a semantic search can be performed to extract the relevant information along with the timeframe of the video. Prerecorded videos can be processed using a predetermined transcript, whereas real-time videos are processed using an auto-generated transcript. An image-based mode can be provided using deep learning techniques that learn visual contexts from a corresponding natural language context (e.g., using a model that is trained using image-text pairs). The context, semantic meaning, image entities, and relationships between entities are extracted from the image frames. Embeddings are generated and a semantic search of the text-based model is performed for selected timeframes and corresponding text transcripts to extract the relevant images and corresponding information for the whole video, as well as from other videos and/or other knowledge sources. From the text transcript, a named entities recognizer can identify the entities present in a video and the relationships between entities. From the outputs of the text-based and image-based models, including outputs generated by analyzing external data with respect to a particular multimedia content item, (e.g., other video sources and/or other knowledge sources), a knowledge graph can be generated in which entities are represented according to the relevant images.

Thus, example embodiments improve the technical fields of query processing, video analysis, natural language processing, and the like, by employing machine learning techniques to analyze multimedia content in order to generate knowledge graphs for processing user queries relating to the multimedia content. In particular, a knowledge graph can be generated that includes entities in the video and/or audio portions of the multimedia content, as well as relationships between entities. The knowledge graph can be augmented using additional data that can be obtained from sources external to the multimedia content, such as other videos, private data sources, public data sources, and the like. A user's query itself can be used to expand a knowledge graph by extracting entities from the query, obtaining data about those entities, and integrating that data into the knowledge graph. Thus, one or more example embodiments may improve the accuracy of results of processing queries (e.g., by increasing the likelihood of returning relevant information), reduce the amount of time to process queries, and expand the possible set of answers to user queries.

Additionally, one or more example embodiments may aid in avoiding interruptions during live presentations by automatically responding to user queries, rather than interrupting a presenter. One or more example embodiments may increase user engagement by not requiring a user to manually search for content in a video, e.g., the techniques presented herein may automatically recommend relevant portions of a video to a user. Also, the techniques presented herein may generation additional information about one or more entities in the video based on user query.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

FIG. 1 is a block diagram depicting a network environment 100 for processing queries relating to multimedia content using knowledge graphs, according to an example embodiment. As depicted, network environment 100 includes a media processing server 102, one or more client devices 118, and one or more data sources 130, which are in communication via a network 134. It is to be understood that the functional division among components have been chosen for purposes of explaining various embodiments and is not to be construed as a limiting example.

Media processing server 102 includes a network interface (I/F) 104, at least one processor (computer processor) 106, memory 108 (which stores instructions for a session hosting module 110, a media processing module 112, and a query processing module 114), and a database 116. In various embodiments, media processing server 102 may include a rack-mounted server, laptop, desktop, smartphone, tablet, or any other programmable electronic device capable of executing computer readable program instructions. Network interface 104 enables components of media processing server 102 to send and receive data over a network, such as network 134. Media processing server 102 may facilitate communication sessions between users in which media content is shared. Additionally or alternatively, media processing server 102 may analyze multimedia data (e.g., audio and/or video data) to generate knowledge graphs. Media processing server 102 may process user queries using knowledge graphs to automatically generate responses to the user queries.

Session hosting module 110, media processing module 112, and query processing module 114 may include one or more modules or units to perform various functions of the embodiments described below. Session hosting module 110, media processing module 112, and query processing module 114 may be implemented by any combination of any quantity of software and/or hardware modules or units, and may reside within memory 108 of media processing server 102 for execution by a processor, such as processor 106.

Session hosting module 110 may perform operations relating to initiating and hosting conferencing sessions between participants, including facilitating the exchange of data between endpoint devices of participants (e.g., client device 118). Session hosting module 110 may facilitate the exchange of video data, audio data, and/or text data during a conferencing session so that users can communicate with each other during the session. The data that is exchanged may be received from video cameras, microphones, and/or other input devices, and can be obtained from, and/or provided to, any devices participating in a conferencing session.

Session hosting module 110 may provide multimedia data to the other modules (e.g., media processing module 112 and/or query processing module 114) so that the multimedia data can be analyzed in accordance with the embodiments presented herein. The multimedia data can be prerecorded data or can include streaming data (e.g., data associated with a conference session supported by session hosting module 110).

Media processing module 112 may include logic for analyzing multimedia data in order to identify entities in the data and relationships between entities. Media processing module 112 can generate data structures such as knowledge graphs in which entities are represented as nodes and relationships between entities are represented as edges connecting the nodes. Media processing module 112 may include one or more machine learning models, which can perform a variety of tasks in order to extract entities and relationships between entities from multimedia data. An entity may refer to a specific, named object, concept, or item within multimedia data that belongs to a predefined category or class. The categories or classes can include people, organizations, locations, dates, times, quantities, ordinal values, miscellaneous entities (e.g., event titles, creative works, etc.), and the like. Some of the machine learning models that can be implemented by media processing module 112 are depicted and described in further detail below with reference to FIG. 5.

In some embodiments, media processing module 112 may analyze an audio data portion of multimedia data in order to perform speech-to-text conversation so that the resulting text transcript can be analyzed by one or more machine learning models. Various natural language processing techniques can be performed to extract entities and relationships between the entities from text transcripts of multimedia data; in some embodiments, named entity recognition techniques are performed to extract the entities and relationships between entities. In one embodiment, a bidirectional encoder representations from transformers (BERT) model is employed to obtain embeddings based on a transcript of audio data, and the resulting embeddings include contextual details that not only identify entities, but also, the relationships between entities.

In some embodiments, media processing module 112 analyzes a video data portion of multimedia data in order to extract entities and relationships between entities. An object recognition model can be applied to the video data to identify objects, including humans, that are depicted in the video data. Additionally, events can be identified, such as actions performed by or to an object and/or particular interactions between objects. The object recognition model can thus extract entities that are visually present in the video data, as well as relationships between those entities. In some embodiments, media processing module 112 employs a generative model that generates descriptions of images or portions thereof included in the video data. This generated text can also be analyzed using named entity extraction techniques in order to identify entities and relationships between entities.

Media processing module 112 can combine the entities and relationships between entities that are extracted from the audio portion and the video portion of multimedia data in order to more accurately capture entities and relationships between entities that are present in the multimedia data. In particular, the identified entities and relationships between entities can be correlated based on a timestamp of the multimedia video from which each entity or relationship is extracted, thus enabling a knowledge graph to be generated that integrates entities from video data and audio data according to their relationships between each other as well as according to the time spans during which the entities are present or discussed. Media processing module 112 may employ a neural network such as a Contrastive Language-Image Pre-Training (CLIP) model that is trained using examples of image-text pairs to identify, in multimedia data, the relationships between image and text embeddings, thus combining the results of separately analyzing the video data and audio data by different machine learning models. Accordingly, media processing module 112 can analyze multimedia data in order to extract entities and relationships between entities, which can be stored or represented as a knowledge graph.

Media processing module 112 may augment (e.g., expand) a knowledge graph using various machine learning models and in response to certain criteria or conditions. For prerecorded multimedia content, a knowledge graph can be generated to extract any desired entities and relationships between entities from the content. For streaming content (i.e., live content), a knowledge graph can be populated by new entities and/or new relationships between entities as additional multimedia is obtained and processed.

Moreover, a knowledge graph can be augmented with one or more additional knowledge graphs based on the entities in the knowledge graph and/or based on other factors. The additional knowledge graphs can also be generated by media processing module 112 by ingesting data obtained from public and/or private data sources, and can include other multimedia content. In particular, if there is an additional knowledge graph whose domain (e.g., topic) relates to an entity in a knowledge graph, the knowledge graphs may be combined to provide an augmented knowledge graph. For example, if multimedia content includes or discusses a specific entity (e.g., a particular make and model of vehicle or particular computing device), a knowledge graph of the multimedia content may be augmented with an additional knowledge graph that includes data about that entity (e.g., the particular make and model of vehicle or particular computing device).

In some embodiments, a knowledge graph that is generated based on a multimedia content item may be augmented with an additional knowledge graph that is generated based on a different multimedia content item. For example, if a video presentation is presented by a same presenter, presented to a same audience, or relates to a same or similar topic as another video presentation, knowledge graphs corresponding to each video presentation can be combined. In some embodiments, a knowledge graph is augmented based on a user query: any entities and/or relationships that are extracted from the user query are used to obtain additional data sourced externally from the multimedia data, and the additional data is processed into a knowledge graph that is integrated into the knowledge graph that corresponds to the multimedia data. A knowledge graph relating to a multimedia content item can thus be augmented with data external to the content item to any desired degree, thereby improving the responses to any user queries regarding the content item.

Query processing module 114 may process user queries relating to multimedia content using a knowledge graph that is generated based on the multimedia content. One or more natural language processing models may be implemented by query processing module 114 to extract entities from a user query and/or to perform natural language understanding processing on the user query in order to identify information in the knowledge graph that may be used to respond to the user query. In some embodiments, entity extraction is performed on a user query to augment a knowledge graph with entities and relationships between entities that are extracted based on the user's query, which can involve obtaining additional data from one or more data sources or other multimedia data. The user query may be obtained in the form of text or audio, which can be converted to text using a speech-to-text model. Once obtained, a query may be adapted for processing against a knowledge graph. The generated query can be executed against the knowledge graph using a query language designed for knowledge graph data retrieval. The results of the query may include a set of data points, entities, or relationships between entities from the knowledge graph that are relevant to the question. Thus, these data points often include nodes (entities) and edges (relationships) within the graph. A natural language processing model can then process the retrieved information to generate a meaningful answer to the question. This processing may involve aggregation, summarization, or extraction of specific data points from the knowledge graph data. The results can then be provided to a user's client device (e.g., client device 118). In some embodiments, multiple responses may be generated and ranked with a machine learning model in order to select a particular response for a user query.

Database 116 may include any non-volatile storage media known in the art. For example, database 116 can be implemented with a tape library, optical library, one or more independent hard disk drives, or multiple hard disk drives in a redundant array of independent disks (RAID). Similarly, data stored in database 116 may conform to any suitable storage architecture known in the art, such as a file, a relational database, an object-oriented database, and/or one or more tables. Database 116 may store data that includes any data obtained from a public data source, such as data acquired by accessing public databases or crawling the Internet. Additionally or alternatively, database 116 may store data obtained from a private data source, such as private data of an enterprise from which the analyzed multimedia data (i.e., the data used to generate a knowledge graph) is also obtained. Database 116 may store knowledge graphs that are obtained according to present example embodiments, which can be used to augment other knowledge graphs for user query processing.

Client device 118 may include a network interface (I/F) 120, at least one processor (computer processor) 122, a display 124, and memory 126 (which stores instructions for a client module 128). In various embodiments, each client device may include a rack-mounted server, laptop, desktop, smartphone, tablet, or any other programmable electronic device capable of executing computer readable program instructions. Network interface 120 enables components of client device 118 to send and receive data over a network, such as network 134. Client device 118 may include one or more modules or units to perform various functions of the embodiments described below. In particular, client module 128 may be implemented by any combination of any quantity of software and/or hardware modules or units, and may reside within memory 126 of client device 118 for execution by a processor, such as processor 122. In some embodiments, client device 118 is used to participant in a conference session that is hosted by media processing server 102. Client device 118 can present data (e.g., multimedia data) via display 124.

Client module 128 may perform various operations to enable a user of client device 118 to participate in a conferencing session. The exchange of data can be performed in real-time or near-real-time in order to enable collaboration between users, and the exchange of data may be facilitated by a server (e.g., session hosting module 110 of media processing server 102). Client module 128 may enable a user to submit user queries regarding multimedia content that is presented by client module 128, and client module 128 may present to a user any responses to user queries (e.g., responses that are generated by media processing server 102).

Data sources 130 may include one or more network-accessible data sources that include any data that can be used to generate or augment knowledge graphs for use in present example embodiments. The data sources 130 may each include one or more databases 132, which can store data in any suitable storage architecture. The data in data sources 130 may include text data, multimedia data (e.g., video data and/or audio data), or other data. In some embodiments, the data in data sources 130 is arranged in knowledge graphs. Each data source 130 may correspond to a public data source (e.g., data that is accessible over the Internet or another network) or data sources 130 can include private data sources, such as proprietary data that is privately controlled by an enterprise. Data sources 130 may be accessible by media processing server 102 in order to obtain data for the generation of knowledge graphs in order to respond to user queries.

Network 134 may include a local area network (LAN), a wide area network (WAN) such as the Internet, or a combination of the two, and includes wired, wireless, or fiber optic connections. In general, network 134 can be any combination of connections and protocols known in the art that will support communications between media processing server 102, client device 118, and/or data sources 130 via their respective network interfaces in accordance with the described embodiments.

Figure 2:
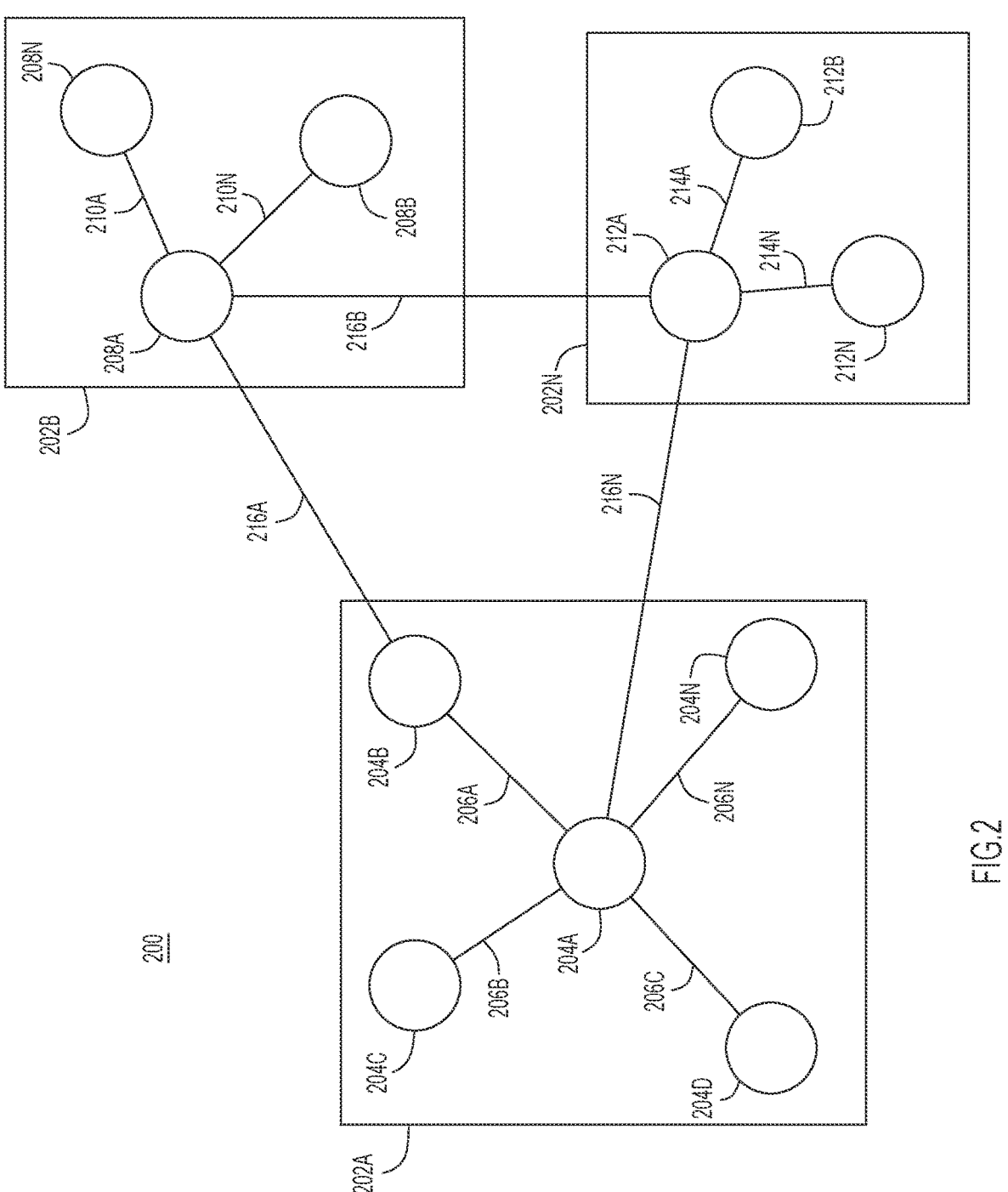
FIG. 2 is a diagram depicting a knowledge graph, according to an example embodiment.

FIG. 2 is a diagram depicting a knowledge graph 200, according to an example embodiment. The knowledge graph 200 may be an augmented knowledge graph that includes three or more subgraphs: first knowledge subgraph 202A, second knowledge subgraph 202B, and a third knowledge subgraph 202N are depicted. The knowledge graph 200 includes a plurality of nodes (e.g., nodes 204A, 204B, 204C, 204D, . . . 204N, nodes 208A, 208B, . . . 208N, and nodes 212A-212N) and edges (e.g., edges 206A, 206B, 206C, . . . 206N, edges 210A-210N, edges 214A-214N, and edges 216A-216N). Each node may represent an entity, and each edge may connect two nodes and may represent a relationship between two entities. In the depicted example, knowledge subgraph 202A includes nodes 204A-204N which are connected by edges 206A-206N; knowledge subgraph 202B includes nodes 208A-208N which are connected by edges 210A-210N; and knowledge subgraph 202N includes nodes 212A, 212B, . . . 212N which are connected by edges 214A-214N. Additionally, the knowledge subgraphs are linked by edges 216A, 216B, . . . 216N to form an augmented knowledge graph (i.e., knowledge graph 200).

The relationships can include data that defines the nature of each relationship, such as "Is A," indicating inheritance or subsumption; "Part Of," signifying containment; "Located In," denoting spatial or geographical location; "Has," representing ownership or possession; "Works At," describing professional affiliations; "Child Of" and "Parent Of," reflecting parent-child relationships; "Friend Of" indicating social connections; "Related To," indicating general associations; "Works On," showing collaborative efforts; "Created By," expressing authorship; "Founded By," illustrating organizational origins; and "Influenced By," highlighting entities' impact on one another. It should be appreciated that this listing of relationship types is provided as an example and should not be construed as limiting, as example embodiments can support any relationship type between entities.

The knowledge subgraphs 202A-202N may each relate to a particular domain or subject, such as a multimedia data item, a physical object, a concept, a process, and the like. For example, the first knowledge subgraph 202A may be generated by extracting entities and relationships from multimedia content; the second knowledge subgraph 202N may include additional data describing an entity (e.g., node 204B in the first knowledge subgraph 202A), which is related by the relationship indicated by edge 216A. Likewise, the third knowledge subgraph 202N may include other additional data describing an entity (e.g., node 204A), which is related by the relationship indicated by edge 216N. Thus, knowledge graph 200 can represent an augmented knowledge graph that may be initially generated by processing multimedia data, and then expanded with additional subgraphs.

Figure 3A:
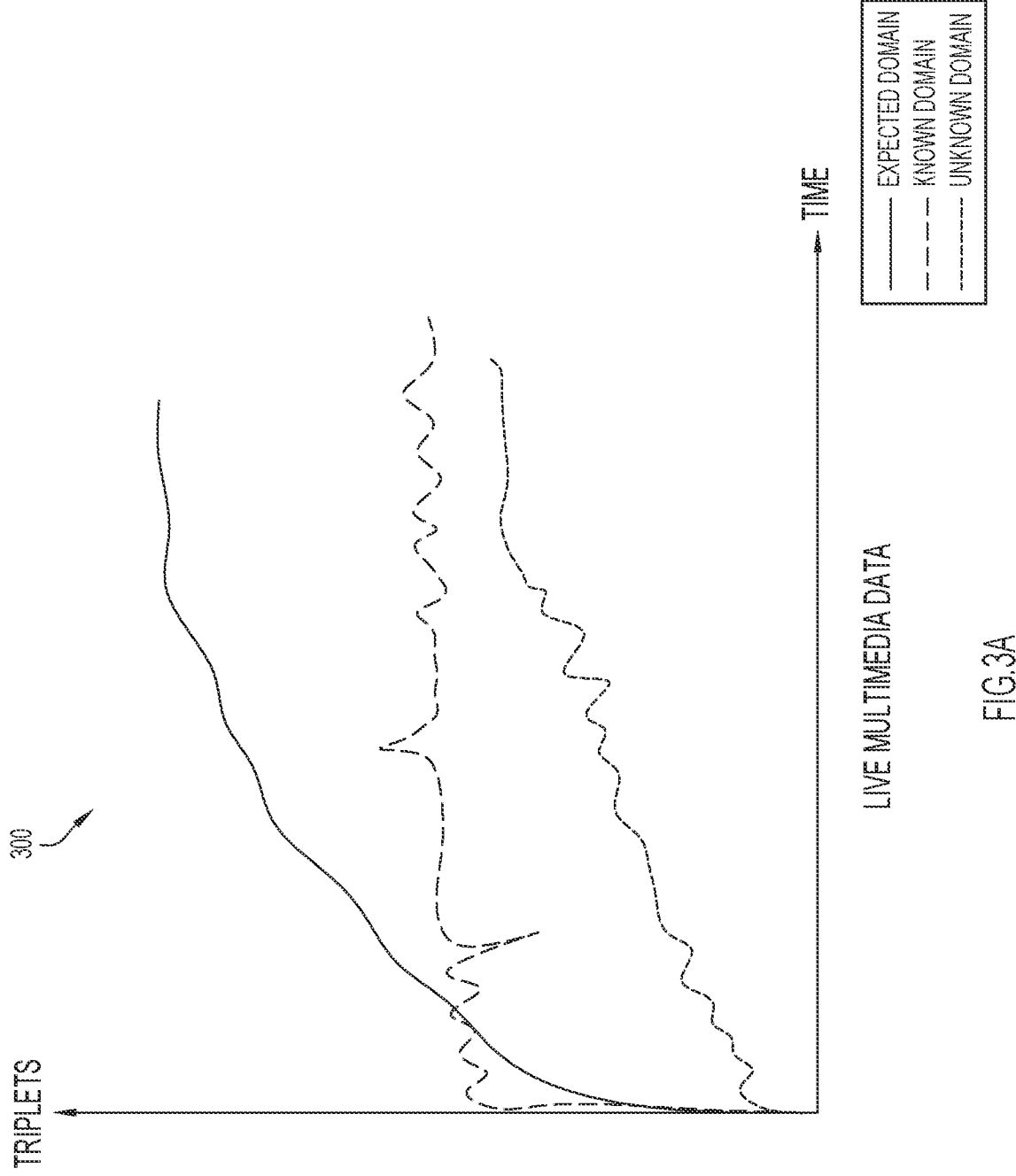
FIGS. 3A and 3B are graphs depicting the development of knowledge graph triplets over time, according to an example embodiment.
Figure 3B:
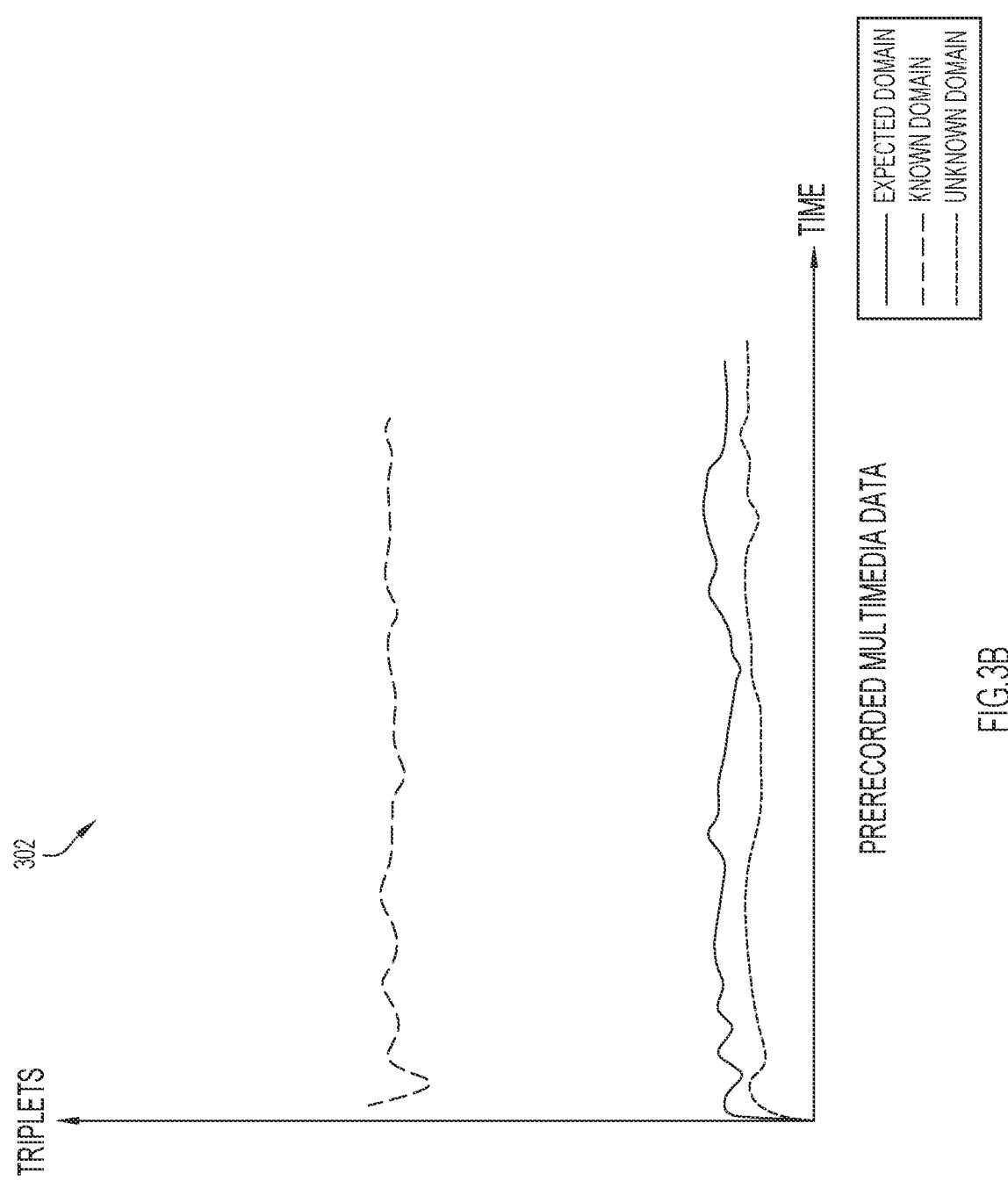

FIGS. 3A and 3B are graphs 300 and 302, respectively, depicting the development of knowledge graph triplets over time, according to an example embodiment. Each graph 300 and 302 illustrates the changing ratios of triplets within the corresponding knowledge graph for live multimedia data and prerecorded multimedia data, respectively, over time. The term "knowledge graph evolution" can describe the proportion of newly-added edges to a knowledge graph. For a live multimedia data, the pattern of evolution in graph 300, depicted in FIG. 3A, may vary based on different domains, such as a known domain (e.g., enterprise data), an expected domain (a video topic), and an unknown domain (a particular user query about the video, which may involve an unanticipated topic). The data presented in each graph 300 and 302 demonstrates that, while the evolution of a knowledge graph can differ, this evolution tends to follow a linear growth pattern as the knowledge graph expands to contain more information in terms of entities. However, in the case of prerecorded multimedia data, the data can be processed at once, and the evolution of the corresponding knowledge graph 302 (depicted in FIG. 3B) may have a more static growth as compared to the grown illustrated in graph 300 (depicted in FIG. 3A).

Figure 4:
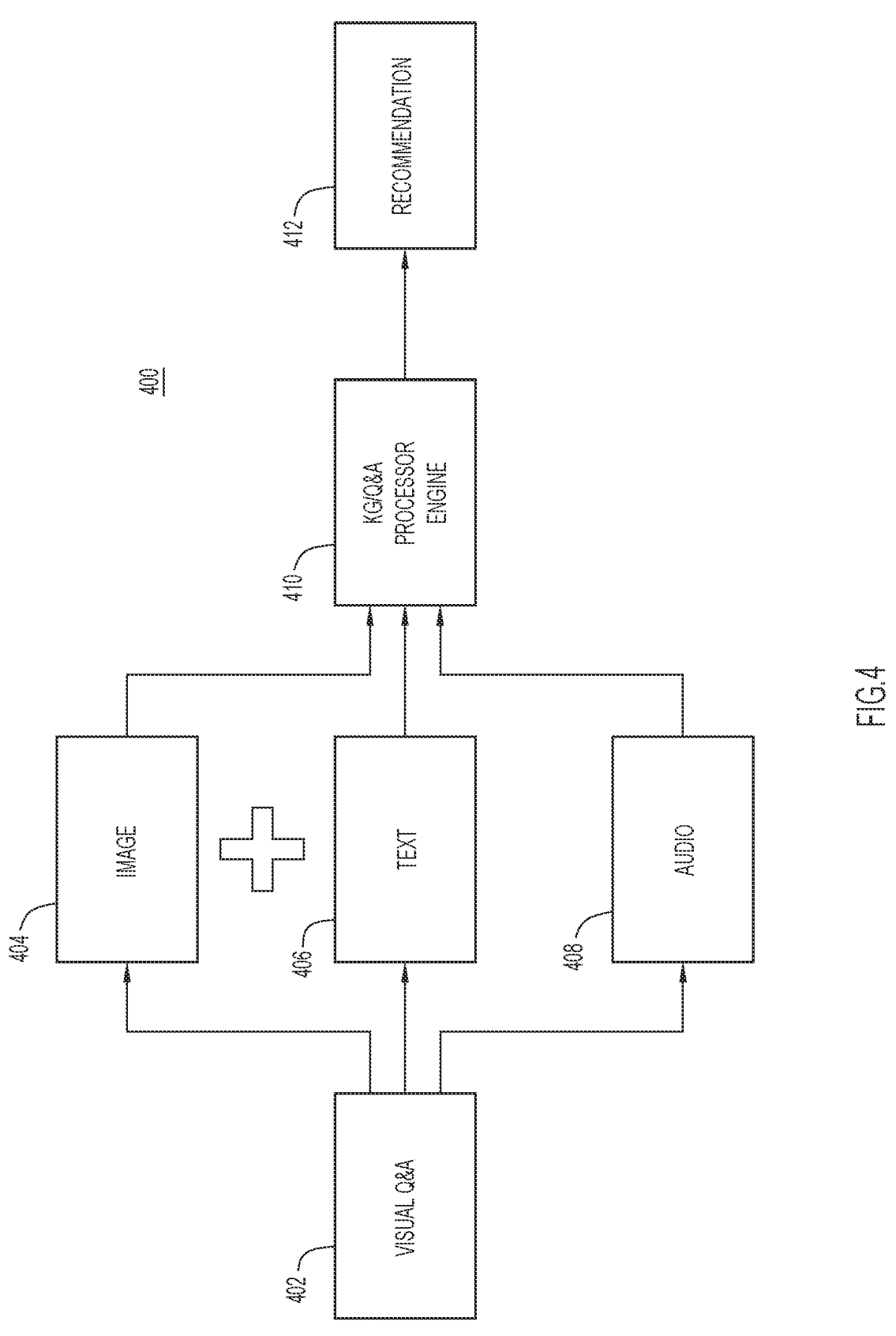
FIG. 4 is a block diagram depicting a question-and-answer machine learning model, according to an example embodiment.

FIG. 4 is a block diagram depicting a question-and-answer machine learning workflow 400, according to an example embodiment. As depicted, the question-and-answer machine learning workflow 400 includes visual question-and-answer mappings 402, image embeddings 404, text embeddings 406, and audio embeddings 408; a knowledge graph/question-and-answer (KG/Q&A) processor engine 410, and a recommendation 412 that is output. KG/Q&A processor engine 410 may be implemented by media processing module 112, as depicted and described with reference to FIG. 1.

Visual question-and-answer mappings 402 may include mappings of various entities extracted from a current video, other sources, and/or a user query. The visual question-and-answer mappings 402 may thus be obtained from a conference session and can be extracted from multimedia data. The image embeddings 404 may be extracted from a video portion of the multimedia data, and the audio embeddings 408 can be extracted from an audio portion of the multimedia data. Text embeddings 406 can be generated by processing audio data using a speech-to-text model and/or by processing image data using a generative model that generates descriptions of visual content in the multimedia data. Image embeddings 404, text embeddings 406, and/or audio embeddings 408 can be provided to KG/Q&A processor engine 410, which performs entity and relationship extraction using various machine learning models in order to generate a knowledge graph. For example, the KG/Q&A processor engine 410 may use a large language model (LLM) to identify relationships between the entities corresponding to the embeddings.

KG/Q&A processor engine 410 may develop a knowledge graph based on the entities identified by the image and text analysis components, which may also store the relationships between identified entities. This knowledge graph may then be processed by KG/Q&A processor engine 410 using a user query to determine an answer to the user query, which can be generated using natural language processing and output as recommendation 412. In some embodiments, multiple candidate answers may be generated and one may be selected to use as a response to a query based on semantic matching. The user query itself may also cause KG/Q&A processor engine 410 to obtain additional embeddings based on entities identifies in the query, thus expanding the knowledge graph as a query is received and processed.

Figure 5:
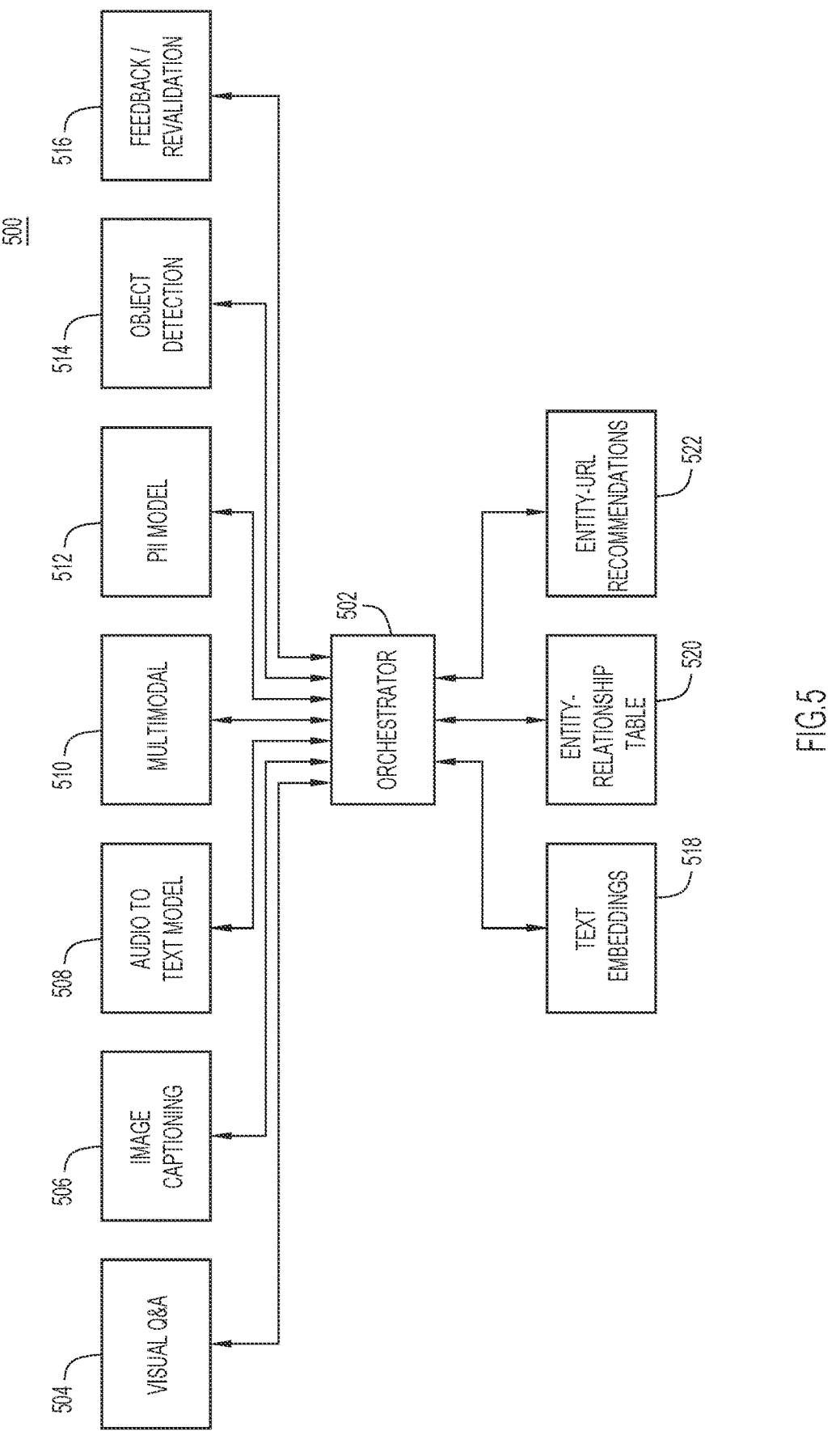
FIG. 5 is a block diagram depicting a multi-model search engine, according to an example embodiment.

FIG. 5 is a block diagram depicting a multi-model search engine 500, according to an example embodiment. As depicted, the models can include a visual question-and-answer model 504, an image captioning model 506, an audio-to-text model 508, a multi-modal processing model 510, a personally identifiable information (PII) model 512, an object detection model 514, and a feedback/revalidation model 516. Additionally, an orchestrator 502 may process input data (e.g., multimedia data and/or other data) in order to select and/or provide particular portions of data to the particular models for processing the particular portions of data. The models of multi-model search engine 500 can be provided with input that includes multimedia data corresponding to a particular content item (e.g., a prerecorded video or a live video), as well as any data obtained from public and/or private sources, which can include unstructured text data, other multimedia data, and the like.

Visual question-and-answer model 504 may include a model for performing computer vision tasks in which machine learning models can answer questions about images by combining image analysis and natural language processing to provide text-based answers. As such, visual question-and-answer model 504 may utilize the processing output of one or more other models of multi-model search engine 500, which can be assembled into a knowledge graph that visual question-and-answer model 504 analyzes in order to generate responses. Image captioning model 506 may perform computer vision and natural language processing tasks in which one or more machine learning models generate textual descriptions for images by extracting visual features and using contextual understanding to form coherent captions. Audio-to-text model 508 may include a natural language processing system that converts spoken or auditory input into written text using techniques such as automatic speech recognition (ASR) that can be supported by one or more neural network models. Multi-modal processing model 510 performs processing to simultaneously analyze and understand information from multiple data modalities, such as text, images, and audio, to extract entities and relationships and combine these entities from different modalities into a knowledge graph. PII model 512 includes a machine learning or other model that detects and de-identifies personal information before transmitting the data to other models, ensuring user privacy and compliance with any desired data protection regulations. Object detection model 514 identifies and locates specific objects or events within images or videos, enabling tasks like tracking, classification, and localization. Together, these models can pre-process multimedia data, extract entities from the data, extract relationships between entities from the data, and combine the results into a knowledge graph that is searchable in order to respond to user queries using natural language processing.

Feedback/revalidation model 516 performs a continuous process of iteratively improving model performance by incorporating user feedback and reassessing model accuracy and reliability. In particular, user feedback may be obtained that indicates whether a response to a user query is helpful, relevant, accurate, etc., given the user's query, and feedback/revalidation model 516 can update the other models accordingly. In particular, feedback/revalidation model 516 may adjust the weights of any neural networks or cause machine learning models to be retrained in order to improve the accuracy of generated responses. Thus, as multi-model search engine 500 is applied over time, the accuracy of any generated responses will increase.

As outputs of the models, text embeddings 518 may include numerical vectors that facilitate the representation and comparison of text for various natural language processing tasks like sentiment analysis and document retrieval. Text embeddings 518 include embeddings obtained from object recognition, text descriptions of video data, and the like, in addition to embeddings obtained from analyzing transcripts of audio data. Thus, a multidimensional vector space model can be generated that includes vector representations of embeddings, which can be used to identify closely-related entities for constructing a knowledge graph. Entity-relationship table 520 can include a table structure that is enriched with metadata, and which serves as a structured listing of associations between different entities.

This table enables the modelling and understanding of complex relationships within datasets or knowledge graphs. In some embodiments, entity-relationship table 520 is populated with entries that include the entities and relationships extracted by the various models of multi-model search engine 500, and entity-relationship table 520 can be used to generate a knowledge graph. Entity-Uniform Resource Locator (URL) and similar multi-model recommendations 522 are output based on the knowledge source, and can include third-party information that is used to answer the user questions. The outputs may include responses to user queries that are processed by the various components of multi-model search engine 500. The outputs may additionally include URLs that link a user to a web resource that provides additional information about a subject of the user's query.

FIG. 6 is a block diagram depicting a knowledge graph user interface 600, according to an example embodiment. As depicted, knowledge graph user interface 600 includes a plurality of nodes 601A, 601B, 601C, 601D, . . . 601N and edges 602A, 602B, 602C, . . . 602N, each of which represents an entity and a relationship between entities, respectively, that are extracted by analyzing multimedia data and optionally, other data. Knowledge graph user interface 600 also includes user interface elements 606, 608, 610, 612, and 614.

As depicted, knowledge graph user interface 600 provides an interface through which a user can interact to obtain information about any desired entity, including relationships between entities. The knowledge graph may be zoomable or otherwise interactive so that a user can explore specific subsets of entities, such as by toggling the display of only related entities, only entities related by a threshold number of "hops" or connections, and the like. When a user selects a node (e.g., node 601A), user interface elements may display information about that node. As depicted, the node type element 606 indicates that the node is an entity, and node identifier element 608 provides a unique identifier for the node. Attribute element 610 indicates an attribute of the entity, and link element 612 provides a link to a resource for obtaining additional information about the entity. Finally, name element 614 indicates a name for the class of entity (in this case, a vehicle).

Figure 7:
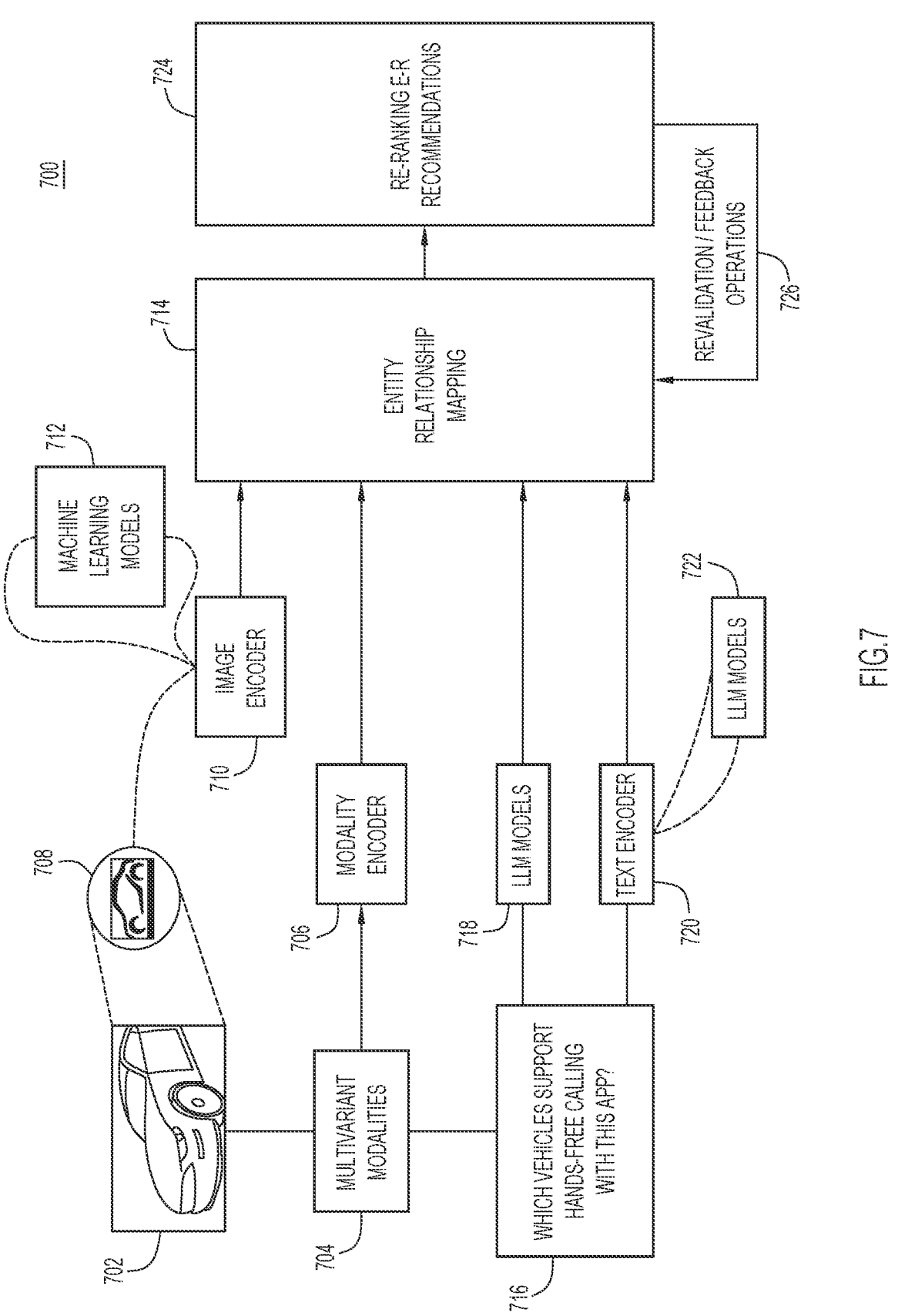
FIG. 7 is a flow diagram depicting a recommendation engine, according to an example embodiment.

FIG. 7 is a flow diagram depicting a recommendation engine 700, according to an example embodiment. As depicted, multimedia data 702 is analyzed by obtaining multivariant modalities 704 (e.g., video data, text data, audio data, etc.) from the multimedia data, which is encoded by a modality encoder 706 to create a combined set of multimodal embeddings that are used to generate an entity-relationship mapping 714. The embeddings can be obtained by various machine learning approaches that can be tailored for the mode of data (e.g., video data, audio data, text data, etc.) in order to provide a single set of embeddings that captures entities and relationships between entities for the multimedia data 702. Additionally, features can be extracted from the video data, such as logo 708, which can be provided to an image encoder 710 to recognize and classify the features. This can be performed using machine learning models 712, which can include various large language models and/or image and text multimodal models. Machine learning models 712 can include, for example, a Contrastive Language-Image Pre-Training (CLIP) model, a Bootstrapping Language-Image Pre-training (BLIP) model, a Large Language-and-Vision Assistant (LLaVA) model, and the like, which analyze text in combination with images to determine relationships between entities represented in either (or both). Image encoder 710 can also provide embeddings that are used to populate entity-relationship mapping 714, thus ensuring that contexts that are presented in an image portion of multimedia data are represented.

A user query 716, such as "which vehicles support hands free calls with this app?" can be analyzed using one or more large-language models 718 that can obtain a natural language understand of user query 716 and extract entities and relationships, as well as a text encoder 720, which can generate embeddings related to the user query 716 using one or more large language models 722 (e.g., a BERT model). the LLM models 718 may include one or more general LLMs, whereas the LLM models 722 may be fine-tuned by training on data relating to the organization that produced the multimedia data. The results of processing the user query can also be integrated into the entity-relationship mapping 714, as additional entities and/or relationships can be extracted from the user query and/or extracted from additional data that is obtained based on the user query.

The entity-relationship recommendations 724 are reranked to rank relevant answers and the select one or more recommendations to be used as a response to the user query. Ranking of relevant answers can be performed by a predictive portion of a large language model that indicates the most likely responses to a user query. Reranking can be performed over time, as additional entities and relationships can be obtained during playback of a live video as new data becomes available. Thus, a knowledge graph can be dynamically updated as additional data becomes available. This process can be revalidated based on user feedback at the revalidation/feedback operations 726 to update any of the models over time in order to improve model performance and/or accuracy.

FIG. 8 is a flowchart depicting a method 800 of processing queries relating to multimedia content using knowledge graphs, according to an example embodiment.

Multimedia data is obtained comprising an image portion and an audio portion, and a user query with respect to the multimedia data is obtained at operation 802. The multimedia data may be prerecorded data or live data (e.g., streaming data). In some embodiments, the multimedia data corresponds to a conference session between multiple users, such as a presentation. The user query may be received from a user in the form of text or audio data, the latter of which can be processed using a speech-to-text model to generate text corresponding to the audio data.

At operation 804, a knowledge graph of the multimedia data is generated using one or more machine learning models based on the image portion and the audio portion, wherein the knowledge graph includes a plurality of entities and relationships between entities. The video data and the audio data can each be processed using one or more machine learning models to perform entity and relationship extraction. The audio data can be processed using a speech-to-text model to generate a transcript corresponding to the audio data. Various techniques such as named entity recognition can be performed on the transcript in order to extract entities and relationships between entities. Object recognition can be performed on the video data to identify entities in the video data, as well as relationships between the entities. The extracted entities and relationships from the video data and the audio data can be combined into a knowledge graph using multimodal entity processing techniques in order to generate a knowledge graph that correlates entities and relationships from both the audio data and the video data. In some embodiments, timestamps that are associated with time frames in which the entities and relationships are identified are used to correlate entities and relationships between the video data and the audio data. For example, a relationship between a topic discussed in the audio data and an object in the video data can be inferred based on the topic being discussed and the object appearing in temporal proximity to each other during playback of the multimedia data.

At operation 806, an augmented knowledge graph is generated, wherein the augmented knowledge graph augments the knowledge graph with additional entities and additional relationships between the additional entities using additional data that is obtained from a source external to the multimedia data. The knowledge graph that is generated at operation 804 can be augmented with additional entities and relationships between entities by performing entity and relationships extraction on data that is obtained from a source external to the multimedia data. This external data can include one or more other multimedia data items (e.g., other videos), other preexisting knowledge graphs, and any data describing entities and/or relationships identified at operation 804, including unstructured data. The external data can be obtained from a private data source (e.g., a data source corresponding to the same enterprise as the multimedia data) and/or a public data source (e.g., the Internet). The external data may be obtained from the user query itself, which may also be analyzed to extract any entities and/or relationships between entities. Thus, entities and/or relationships that are extracted from the multimedia data can be combined into an augmented knowledge graph with entities and/or relationships that are extracted from a user query, which can also be used to locate additional data, and combine entities and/or relationships extracted from that additional data into a larger knowledge graph.

A response to the user query is provided based on the augmented knowledge graph at operation 808. Natural language processing techniques may be performed to analyze the user query in view of the augmented knowledge graph in order to extract information that can be used by a generative natural language processing model to generate a response to the user query. In some embodiments, the response may include links (e.g., URLs) to other resources that may be of use to the user. In some embodiments, the response may indicate one or more time spans in the multimedia data that the user can review in order to find an answer to the user's query. In some embodiments, the response may cause the user's playback of the multimedia data to jump to one or more points in time that are relevant to the user query.

Figure 9:
FIG. 9 is a block diagram of a device that may be configured to perform operations relating to processing multimedia content, as presented herein.

Referring now to FIG. 9, FIG. 9 illustrates a hardware block diagram of a computing device 900 that may perform functions associated with operations discussed herein in connection with the techniques depicted in FIGS. 1-8. In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O 914 allow for input and output of data and/or information with other entities that may be connected to computing device 900. For example, I/O 914 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe.

Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: obtaining multimedia data including an image portion and an audio portion, and a user query with respect to the multimedia data; generating a knowledge graph of the multimedia data using one or more machine learning models based on the image portion and the audio portion, wherein the knowledge graph includes a plurality of entities and relationships between entities; generating an augmented knowledge graph, wherein the augmented knowledge graph augments the knowledge graph with additional entities and additional relationships between the additional entities using additional data that is obtained from a source external to the multimedia data; providing a response to the user query based on the augmented knowledge graph.

In some aspects, the techniques described herein relate to a computer-implemented method, further including: identifying one or more relevant entities in the augmented knowledge graph based on the user query; and wherein the response is further provided based on the one or more relevant entities.

In some aspects, the techniques described herein relate to a computer-implemented method, wherein the response to the user query indicates a determined timespan of the multimedia data during which the one or more relevant entities are included.

In some aspects, the techniques described herein relate to a computer-implemented method, wherein the multimedia data includes a live multimedia data, and wherein the knowledge graph is dynamically updated while the live multimedia data is being streamed.

In some aspects, the techniques described herein relate to a computer-implemented method, wherein the additional data is obtained based on the user query.

In some aspects, the techniques described herein relate to a computer-implemented method, wherein the additional data relates to a particular entity of the plurality of entities in the knowledge graph, wherein the particular entity is an object identified in the image portion of the multimedia data or a topic identified in the audio portion of the multimedia data.

In some aspects, the techniques described herein relate to a computer-implemented method, wherein the multimedia data is associated with an enterprise, and wherein the additional data is obtained from a private data source of the enterprise.

In some aspects, the techniques described herein relate to a computer-implemented method, wherein the additional data includes different multimedia data.

In some aspects, the techniques described herein relate to a computer-implemented method, wherein the one or more machine learning models include an object recognition model that analyzes the image portion to identify the entities and the relationships between entities, and a bidirectional encodings from transformers (BERT) model that analyzes a text transcript of the audio portion to identify the entities and the relationships between the entities.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain multimedia data including an image portion and an audio portion, and a user query with respect to the multimedia data; generate a knowledge graph of the multimedia data using one or more machine learning models based on the image portion and the audio portion, wherein the knowledge graph includes a plurality of entities and relationships between entities; generate an augmented knowledge graph, wherein the augmented knowledge graph augments the knowledge graph with additional entities and additional relationships between the additional entities using additional data that is obtained from a source external to the multimedia data; provide a response to the user query based on the augmented knowledge graph.

In some aspects, the techniques described herein relate to a system, further including instructions to: identify one or more relevant entities in the augmented knowledge graph based on the user query; and wherein the response is further provided based on the one or more relevant entities.

In some aspects, the techniques described herein relate to a system, wherein the response to the user query indicates a determined timespan of the multimedia data during which the one or more relevant entities are included.

In some aspects, the techniques described herein relate to a system, wherein the multimedia data includes a live multimedia data, and wherein the knowledge graph is dynamically updated while the live multimedia data is being streamed.

In some aspects, the techniques described herein relate to a system, wherein the additional data is obtained based on the user query.

In some aspects, the techniques described herein relate to a system, wherein the additional data relates to a particular entity of the plurality of entities in the knowledge graph, wherein the particular entity is an object identified in the image portion of the multimedia data or a topic identified in the audio portion of the multimedia data.

In some aspects, the techniques described herein relate to one or more non-transitory computer readable storage media having program instructions embodied therewith, the program instructions executable by a computer to cause the computer to perform operations including: obtaining multimedia data including an image portion and an audio portion, and a user query with respect to the multimedia data; generating a knowledge graph of the multimedia data using one or more machine learning models based on the image portion and the audio portion, wherein the knowledge graph includes a plurality of entities and relationships between entities; generating an augmented knowledge graph, wherein the augmented knowledge graph augments the knowledge graph with additional entities and additional relationships between the additional entities using additional data that is obtained from a source external to the multimedia data; providing a response to the user query based on the augmented knowledge graph.

In some aspects, the techniques described herein relate to a One or more non-transitory computer readable storage media, wherein the program instructions further cause the computer to perform operations including: identifying one or more relevant entities in the augmented knowledge graph based on the user query; and wherein the response is further provided based on the one or more relevant entities.

In some aspects, the techniques described herein relate to one or more non-transitory computer readable storage media, wherein the response to the user query indicates a determined timespan of the multimedia data during which the one or more relevant entities are included.

In some aspects, the techniques described herein relate to one or more non-transitory computer readable storage media, wherein the multimedia data includes a live multimedia data, and wherein the knowledge graph is dynamically updated while the live multimedia data is being streamed.

In some aspects, the techniques described herein relate to one or more non-transitory computer readable storage media, wherein the additional data is obtained based on the user query.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   obtaining, by a media processing server including one or more machine learning models, a user query, the user query including a request for a live multimedia stream and one or more descriptions associated with the live multimedia stream;
   obtaining, by the media processing server, live multimedia data comprising an image portion and an audio portion in response to obtaining the user query, wherein the live multimedia data is associated with the one or more descriptions included in the user query;
   generating, by the media processing server, a knowledge graph of the live multimedia data using the one or more machine learning models based on the image portion, the audio portion, and the one or more descriptions included in the user query, wherein the knowledge graph includes a plurality of entities and relationships between entities;
   dynamically updating, by the media processing server, the knowledge graph while the live multimedia data is being streamed;
   obtaining, by the media processing server, additional data from a source external to the live multimedia data, wherein the additional data comprises additional entities and additional relationships between the additional entities;
   obtaining, by the media processing server, a feedback data associated with a previous user query and a previous response to the previous user query;
   dynamically adjusting, by the media processing server, weights of the one or more machine learning models using the feedback data;
   generating, by the media processing server using the one or more machine learning models with adjusted weights, an augmented knowledge graph by iteratively augmenting the dynamically updated knowledge graph with additional entities and additional relationships between the additional entities of the additional data, wherein the augmented knowledge graph is incorporated with the and the feedback data; and
   providing, by the media processing server, a response to the user query based on the augmented knowledge graph.

2. The computer-implemented method of claim 1, further comprising:
   identifying one or more relevant entities in the augmented knowledge graph based on the user query,
   wherein the response is further provided based on the one or more relevant entities, the one or more relevant entities including at least one selected from a group including objects, people, and places.

3. The computer-implemented method of claim 2, wherein the response to the user query indicates a determined timespan of the live multimedia data during which the one or more relevant entities are included.

4. The computer-implemented method of claim 1, wherein the additional data is obtained based on the user query.

5. The computer-implemented method of claim 1, wherein the additional data relates to a particular entity of the plurality of entities in the knowledge graph, wherein the particular entity is an object identified in the image portion of the live multimedia data or a topic identified in the audio portion of the live multimedia data.

6. The computer-implemented method of claim 1, wherein the live multimedia data is associated with an enterprise, and wherein the additional data is obtained from a private data source of the enterprise.

7. The computer-implemented method of claim 1, wherein the additional data comprises different multimedia data.

8. The computer-implemented method of claim 1, wherein the one or more machine learning models include an object recognition model that analyzes video data of the image portion using the one or more descriptions included in the user query to identify the entities and the relationships between entities, and a bidirectional encodings from transformers (BERT) model that analyzes a text transcript of the audio portion to identify the entities and the relationships between the entities.

9. A system comprising:
one or more computer processors;
one or more computer readable storage media; and
program instructions stored on the one or more computer readable storage media for execution by at least one of the one or more computer processors, the program instructions comprising instructions to:
  obtain a user query, the user query including a request for a live multimedia stream and one or more descriptions associated with the live multimedia stream;
  obtain live multimedia data comprising an image portion and an audio portion in response to obtaining the user query, wherein the live multimedia data is associated with the one or more descriptions included in the user query;
  generate a knowledge graph of the live multimedia data using one or more machine learning models based on the image portion, the audio portion, and the one or more descriptions included in the user query, wherein the knowledge graph includes a plurality of entities and relationships between entities;
  dynamically update the knowledge graph while the live multimedia data is being streamed;
  obtain additional data from a source external to the live multimedia data, wherein the additional data comprises additional entities and additional relationships between the additional entities;
  obtain a feedback data associated with a previous user query and a previous response to the previous user query and dynamically adjust weights of the one or more machine learning models using the feedback data;
  generate an augmented knowledge graph, using the dynamically adjusted one or more machine learning models, by iteratively augmenting the dynamically updated knowledge graph with additional entities and additional relationships between the additional entities of the additional data, wherein the augmented knowledge graph is incorporated with the feedback data; and
  provide a response to the user query based on the augmented knowledge graph.

10. The system of claim 9, further comprising instructions to:
  identify one or more relevant entities in the augmented knowledge graph based on the user query,
  wherein the response is further provided based on the one or more relevant entities, the one or more relevant entities including at least one selected from a group including objects, people, and places.

11. The system of claim 10, wherein the response to the user query indicates a determined timespan of the live multimedia data during which the one or more relevant entities are included.

12. The system of claim 9, wherein the additional data is obtained based on the user query.

13. The system of claim 9, wherein the additional data relates to a particular entity of the plurality of entities in the knowledge graph, wherein the particular entity is an object identified in the image portion of the live multimedia data or a topic identified in the audio portion of the live multimedia data.

14. One or more non-transitory computer readable storage media having program instructions embodied therewith, the program instructions executable by a computer to cause the computer to perform operations including:
  obtaining a user query, the user query including a request for a live multimedia stream and one or more descriptions associated with the live multimedia stream;
  obtaining live multimedia data comprising an image portion and an audio portion in response to obtaining the user query, wherein the live multimedia data is associated with the one or more descriptions included in the user query;
  generating a knowledge graph of the live multimedia data using one or more machine learning models based on the image portion, the audio portion, and the one or more descriptions included in the user query, wherein the knowledge graph includes a plurality of entities and relationships between entities;
  dynamically updating the knowledge graph while the live multimedia data is being streamed;
  obtaining additional data from a source external to the live multimedia data, wherein the additional data comprises additional entities and additional relationships between the additional entities;
  obtaining a feedback data associated with a previous user query and a previous response to the previous user query;
  dynamically adjusting weights of the one or more machine learning models using the feedback data;
  generating an augmented knowledge graph, using the dynamically adjusted one or more machine learning models, by iteratively augmenting the dynamically updated knowledge graph with additional entities and additional relationships between the additional entities of the additional data, wherein the augmented knowledge graph is incorporated with the feedback data; and providing a response to the user query based on the augmented knowledge graph.

15. The one or more non-transitory computer readable storage media of claim 14, wherein the program instructions further cause the computer to perform operations including:

identifying one or more relevant entities in the augmented knowledge graph based on the user query, wherein the response is further provided based on the one or more relevant entities, the one or more relevant entities including at least one selected from a group including objects, people, and places.

16. The one or more non-transitory computer readable storage media of claim 15, wherein the response to the user query indicates a determined timespan of the live multimedia data during which the one or more relevant entities are included.

17. The one or more non-transitory computer readable storage media of claim 14, wherein the additional data is obtained based on the user query.

18. The computer-implemented method of claim 2, further comprising:

providing, by the media processing server, a visual knowledge graph comprising the one or more relevant entities and relationships between the one or more relevant entities obtained from the augmented knowledge graph and based on the user query.

19. The system of claim 10, further comprising instructions to:

provide a visual knowledge graph comprising the one or more relevant entities and relationships between one or more relevant entities obtained from the augmented knowledge graph and based on the user query.

20. The one or more non-transitory computer readable storage media of claim 15, wherein the program instructions further cause the computer to perform operations including:

providing a visual knowledge graph comprising the one or more relevant entities and relationships between the one or more relevant entities obtained from the augmented knowledge graph and based on the user query.

\* \* \* \* \*